United States Patent [19]

Solomon et al.

[11] Patent Number: 5,331,927
[45] Date of Patent: Jul. 26, 1994

[54] EXHAUST PORT INSERT

[75] Inventors: James G. Solomon, Grosse Pointe W, Mich.; Thaddeus B. Lilly, Palm Harbor, Fla.; Robert A. Bolton, Rochester, Mich.

[73] Assignee: General Motors Corporation, Detroit, Mich.

[21] Appl. No.: 132,974

[22] Filed: Oct. 7, 1993

[51] Int. Cl.⁵ .............................................. F02B 75/02
[52] U.S. Cl. ................................. 123/65 PE; 251/367
[58] Field of Search ............ 123/65 PE, 65 P, 65 V, 123/73 D, 73 V; 251/367, 304

[56] References Cited

U.S. PATENT DOCUMENTS

| | | | |
|---|---|---|---|
| 4,321,893 | 3/1982 | Yamamoto | 123/65 PE |
| 4,333,431 | 6/1982 | Ito et al. | 123/65 PE |
| 4,903,647 | 2/1990 | Yamamoto et al. | |
| 4,924,819 | 5/1990 | Boyesen | 123/65 PE |
| 5,063,888 | 11/1991 | Ozawa et al. | 123/65 PE |
| 5,190,006 | 3/1993 | Motoyama et al. | 123/65 PE |

*Primary Examiner*—Tony M. Argenbright
*Assistant Examiner*—M. Macy
*Attorney, Agent, or Firm*—Charles K. Veenstra

[57] ABSTRACT

A two stroke cycle engine has an engine block with a cylinder bore accommodating a piston. An exhaust port connects the cylinder bore to an outside of the engine block. An exhaust port control valve mechanism within the engine, according to this invention, includes a valve pivotally mounted in the exhaust port between the cylinder bore and the outside for rotation between an open position and a closed position. The valve defines an upper timing edge of the exhaust port. An insert fills a volume in the exhaust port between the valve and the outside, thereby improving flow efficiency of the exhaust port.

7 Claims, 2 Drawing Sheets 5,331,927

EXHAUST PORT INSERT

TECHNICAL FIELD

This invention relates to timing mechanisms for two stroke cycle engines.

BACKGROUND OF THE INVENTION

In the design of a low emission two stroke cycle engine, exhaust port timing control valves are used to control emissions and to provide desired low engine speed performance. A rotary valve disposed in the exhaust port between a cylinder bore and an outside of an engine block is the preferred valve configuration.

Typically the exhaust port is formed as part of the engine block casting. A pocket for the valve is machined in the exhaust port. A preferred method for machining the exhaust port valve pocket is to make a plunge cut from the outside of the block with a form cutter of the same general shape as the valve along an axis of the exhaust port. The exhaust valve is then passed into the exhaust port and rotatably mounted in the valve pocket.

This method of machining and valve installation requires that the exhaust port as cast be sized to accommodate the cutter and valve. The resultant exhaust port flow area between the valve and the outside of the block is larger than the flow area at the valve, and larger than the flow area of the exhaust manifold which mounts to the outside of the block. Exhaust flow passing through the exhaust port is subjected to an undesired volume expansion between the valve and the exhaust manifold. The expansion caused by the discontinuous increase in flow area causes the exhaust port to flow inefficiently.

Port designs which flow well, by contrast, have a near constant flow area along their length. Slight variation or divergence in the flow area along the length of the port will yield slightly better flow than a constant flow area. An exhaust port and valve according to this invention both enables the use rotary valves and plunge cutting and provides an efficient flow of exhaust therethrough.

SUMMARY OF THE INVENTION

A two stroke cycle engine has an engine block with a cylinder bore accommodating a piston. An exhaust port connects the cylinder bore to an outside of the engine block. An exhaust port control valve mechanism within the engine, according to this invention, includes a valve pivotally mounted in a machined valve pocket in the exhaust port between the cylinder bore and the outside for rotation between an open position and a closed position.

The valve defines an upper timing edge of the exhaust port. The exhaust port is sized to allow the valve pocket to be machined by making a plunge cut with a shaped cutter having the same general shape of the valve. An insert is provided to fill the excess volume in the exhaust port resulting from the required sizing to accommodate the cutter, thereby establishing a substantially consistent cross-sectional flow area to provide a smooth exhaust flow transition from the valve to an exhaust flow manifold.

This invention permits the use of plunge cutting of the exhaust ports which offers significant manufacturing efficiencies in the fabrication of multiple cylinder two stroke cycle engines. The exhaust ports for an entire bank of cylinders can be machined simultaneously by a cutting machine having multiple machining heads. The insert of the present invention makes this machining method practical by partially filling the oversized exhaust port produced by the machining. The insert provides a smooth flow transition in the exhaust port between the valve and an exhaust manifold mounted to the outside of the engine block, thereby improving the flow efficiency of the exhaust port.

DESCRIPTION OF THE PREFERRED EMBODIMENT

Figure 1:
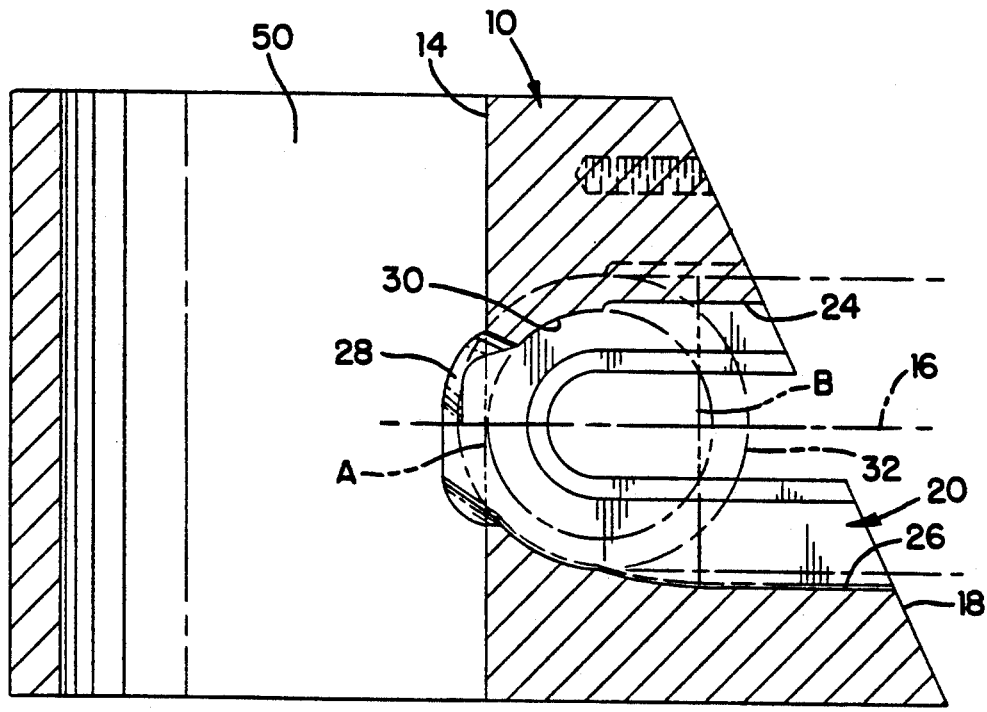
FIG. 1 is a sectional side view of a portion of an engine block.

A V6 type two stroke cycle engine has an engine block 10 with two banks of three pistons 12. Each piston 12 is slidably disposed in a cylinder bore 14, each of which is connected along an exhaust port axis 16 to an outside 18 of the block by an exhaust port 20. An exhaust manifold 22 is mounted to the outside 18 of the block 10 over the exhaust ports 20.

The basic shape of the exhaust port 20 is formed when the engine block 10 is cast. An exhaust port roof 24 and an exhaust port floor 26 are opposed across the exhaust port axis 16. An opening 28 of the exhaust port 20 into the cylinder bore 14 defines a first flow area A of the exhaust port 20. Exhaust port valve pockets 30 are simultaneously plunge cut on each side of the block 10 by a machine (not shown) having three form cutters 32, one for each port 20, which enter the exhaust ports 20 from the outside 18 of the block 10 along the exhaust port axes 16.

The cutters 32 are of the same general shape as an exhaust valve 34. The plunge cutting produces an exhaust port 20 configured to receive the exhaust valves 34 along the exhaust port axes 16 through the outside 18 of the block 10. As a result of the exhaust port 20 being sized to accommodate the cutter, a second flow area B of the exhaust ports 20 between the openings 28 and the outside 18 is consequently larger than the first flow area A.

Figure 2:
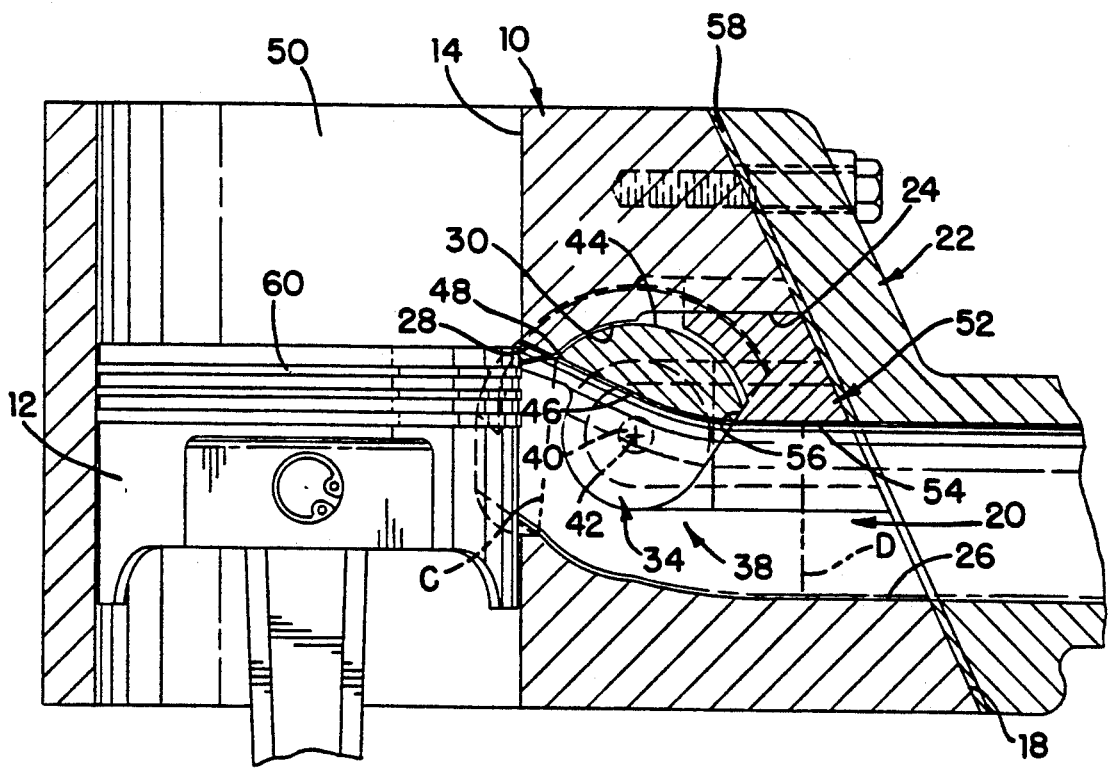
FIG. 2 is a sectional side view of an engine block with an exhaust valve in an open position.
Figure 3:
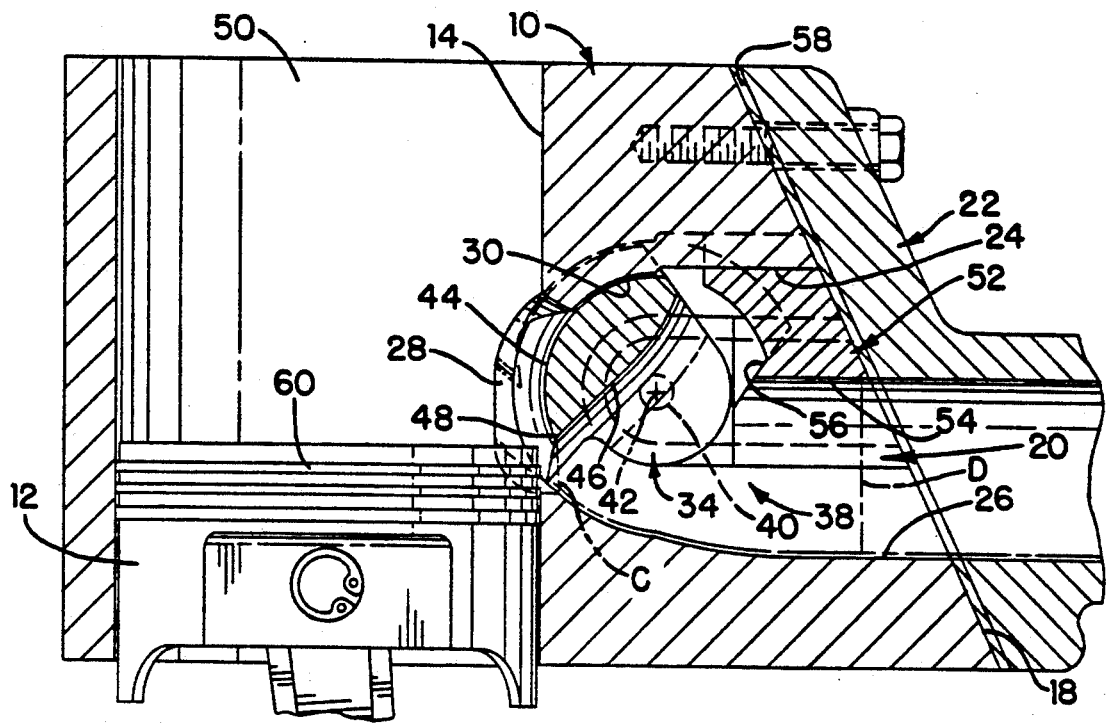
FIG. 3 is a sectional side view of an engine block with the exhaust valve in the closed position.
Figure 4:
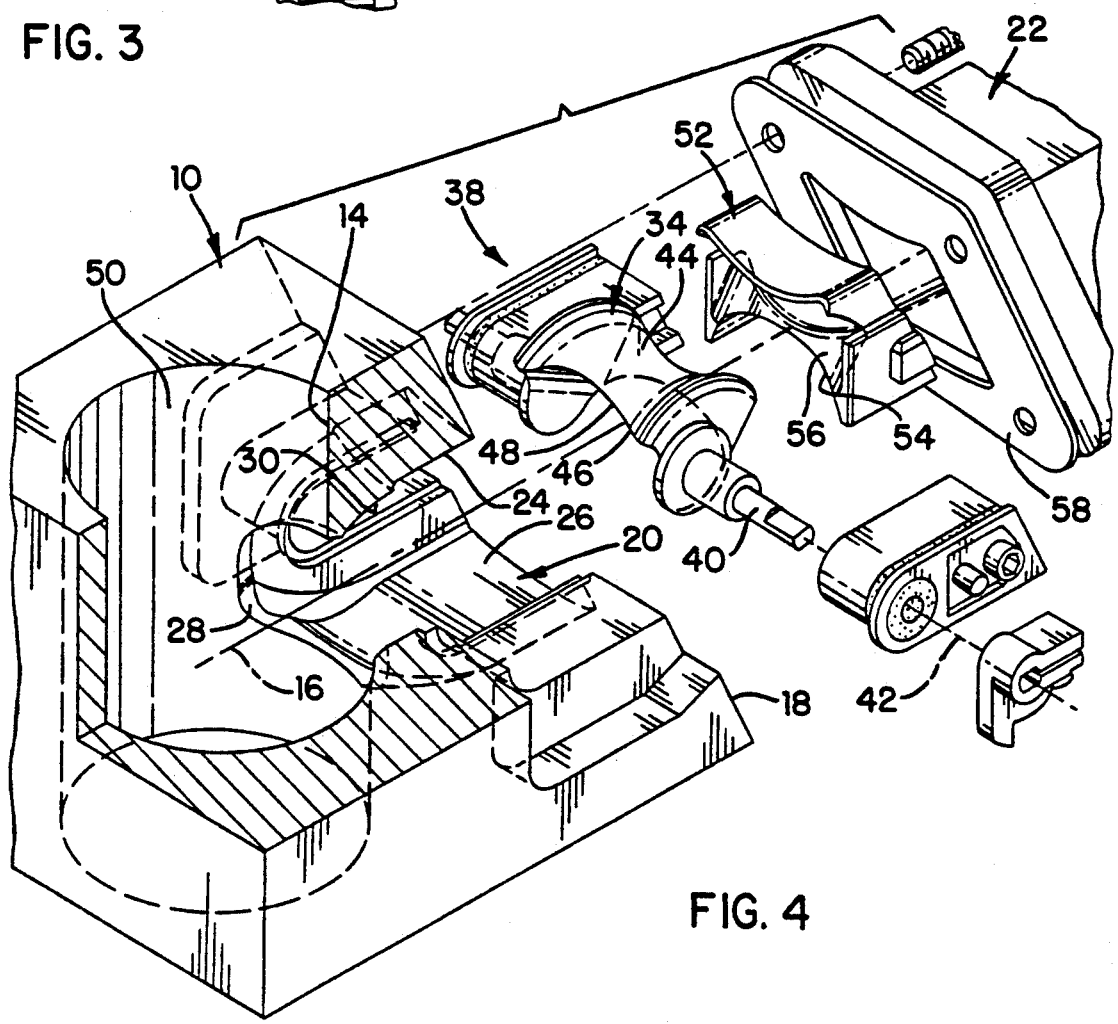
FIG. 4 is an exploded pictorial view of the exhaust valve and the engine block.

A valve mechanism 38, according to the present invention, includes the valve 34 which is pivotally mounted in the pocket 30 of the exhaust port 20, between the cylinder bore 14 and the outside 18 for rotation between an open position shown in FIG. 2, and a closed position shown in FIG. 3. The valve 34 has an integral shaft 40 to accommodate mounting in the engine block 10 which defines a valve axis 42 normal to the exhaust port axis 16 about which the valve 34 rotates.

The valve 34 has a D shaped cross section normal to the axis of rotation 42 as shown in FIGS. 2 and 3. An arcuate sealing surface 44 of the valve 34 slidably seals against a portion of the valve pocket 30 formed in the exhaust port roof 24. A valve roof surface 46 opposite the arcuate sealing surface 44 defines a flow area C approximately equal to the first flow area A with the exhaust port floor 26 when in the open position. A leading intersection of the arcuate sealing surface 44 with the valve roof surface 46 defines an upper timing edge 48 of the exhaust valve 34.

The position of the timing edge 48 controls the point at which a downwardly moving piston 12 opens a combustion chamber 50 in the cylinder bore 14 above the piston 12 to the exhaust port 20. This relationship is commonly known as the timing of the exhaust port 20. The position of the timing edge 48 similarly controls the point at which an upwardly moving piston 12 closes the combustion chamber 50 to the exhaust port 20. It should be appreciated that even in the closed position, the valve 34 does not completely block the opening 28.

A positioning motor (not shown) is drivingly connected with the valve 34 for selectively rotating the valve 34 between the open position and the closed position as a function of engine speed and throttle position.

An insert 52 is placed in the exhaust port 20 between the valve 34 and the outside 18 to fill a volume between the valve 34 and the outside 18 of the block 10. The insert 52 has an insert roof 54 which, with the exhaust port floor 26, defines a flow area D approximately equal to the first flow area A which is appreciably less than the second flow area B as defined by the port roof 24 and floor 26. The insert 52 has a surface serving as a valve travel abutment 56 limiting the valve rotation in a direction of the open position.

A gasket 58 is disposed between the outside 18 of the block 10 and the manifold 22.

The invention operates in the following manner. With the engine idling, the valve 34 is in the closed position as seen in FIG. 3. As a top piston ring 60 moves past the upper timing edge 48, the combustion chamber 50 above the piston 12 is connected to the exhaust port 20 through the exhaust port opening 28. Exhaust gases flow past the valve 34 and into the exhaust port 20. The gases travel toward and into the exhaust manifold 22 without experiencing the undesired expansion between the valve 34 and the manifold 22 that would exist in the absence of this insert 52.

As a throttle pedal (not shown) is depressed and engine speed increases, the valve 34 is moved toward the open position shown in FIG. 2 by the drive motor. The timing edge 48 moves upward, opening the exhaust port 20 to the combustion chamber 50 earlier in the downward piston stroke. Rotation of the valve 34 beyond the open position is prevented by the travel abutment 56 of the insert 52. With the valve 34 in the open position, the flow area from the opening 28 to the exhaust manifold 22 is nearly constant, as the valve roof surface 46 provides a near constant flow area with respect to the exhaust port floor 26 past the valve 34. The gases similarly pass smoothly past the valve insert 52 and into the exhaust manifold 22. The insert 52 provides a flow area D slightly variant from the first flow area A so as to maximize the effectiveness of the exhaust port 20.

It should be appreciated that this invention could be alternatively characterized as being part of an exhaust system for the two stroke cycle engine.

The insert 52 shown is formed of a solid block of material, but it could alternatively be formed by stamping it from sheet metal and placing it into the exhaust port 20, or by stamping gasket material to provide an integrated exhaust manifold gasket and insert. The resultant insert, however formed, improves flow efficiency of the exhaust port 20 by eliminating an undesired expansion chamber between the valve 34 and the exhaust manifold 22.

The embodiments of the invention in which an exclusive property or privilege is claimed are defined as follows:

1. In a two stroke cycle engine having
 an engine block,
 means defining a cylinder bore in the engine block and
 means defining an exhaust port through the engine block along an exhaust port axis from the cylinder bore to an outside of the engine block, an exhaust port control valve mechanism comprising:
 a valve pivotally mounted in the exhaust port between the cylinder bore and the outside for rotation between an open position and a closed position and defining a timing edge of the exhaust port, and
 an insert filling a volume in the exhaust port between the valve and the outside thereby improving flow efficiency of the exhaust port.

2. An exhaust port control valve mechanism as claimed in claim 1, further characterized by:
 the valve pivoting about a valve axis normal to the exhaust port axis, and
 the exhaust port being further defined by an exhaust port roof and an exhaust port floor opposed across the exhaust port axis and configured to receive the valve along the exhaust port axis from the outside.

3. An exhaust port control valve mechanism as claimed in claim 2, further characterized by:
 the exhaust port forming an opening at the cylinder bore with the opening providing a first flow area normal to the exhaust port axis,
 the exhaust port between the opening and the outside providing a second flow area larger than the first flow area,
 the valve having a D shaped cross section normal to the axis of rotation providing
 an arcuate sealing surface adapted to slidably seal against the exhaust port roof and
 a valve roof surface opposite the arcuate sealing surface defining a flow area approximately equal to the first flow area with the exhaust port floor when in the open position and
 the upper timing edge being defined by the intersection of the arcuate sealing surface and the valve roof surface, and
 the insert having an insert roof which with the exhaust port floor defines a flow area approximately equal to the first flow area.

4. An exhaust port control valve mechanism as claimed in claim 3, further characterized by the insert roof defining a flow area slightly divergent from the first flow area thereby optimizing exhaust port flow.

5. An exhaust port control valve mechanism as claimed in claim 4, further characterized by the insert having a valve travel abutment limiting valve rotation in a direction of an open position.

6. An exhaust system for a two stroke cycle engine having an engine block and means defining a cylinder bore in the engine block, the exhaust system comprising:
 means defining an exhaust port extending from the cylinder bore and through the engine block to an outside of the engine block and having
 a valve pocket at an end of the bore adjacent the cylinder bore and
 an exhaust port area,
 a valve pivotally mounted in the valve pocket for rotation between an open position and a closed position to control exhaust timing and defining an initial flow area less than the exhaust port area for exhaust gases entering the exhaust port from the cylinder bore, and an insert filling a volume in the exhaust port to establish a continuous exhaust flow area of the exhaust port from the valve to the outside of the engine block that is approximately equal to the initial flow area as defined by the valve in the open position.

7. An exhaust system as claimed in claim 6, further characterized by the exhaust port being configured so that the valve may be inserted therethrough from the outside of the engine block for mounting in the valve pocket.

* * * * *